US008751931B2

(12) United States Patent
Walter et al.

(10) Patent No.: US 8,751,931 B2
(45) Date of Patent: Jun. 10, 2014

(54) SYSTEM AND METHOD FOR PROVIDING USER-DEFINABLE AUDIO INDICATORS FOR MULTIMEDIA CHANNEL SELECTIONS

(75) Inventors: Edward Walter, Boerne, TX (US); Yolius Diroo, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2372 days.

(21) Appl. No.: 11/269,861

(22) Filed: Nov. 7, 2005

(65) Prior Publication Data
US 2007/0107037 A1 May 10, 2007

(51) Int. Cl.
*G06F 3/00* (2006.01)

(52) U.S. Cl.
USPC ........... 715/710; 715/714; 715/728; 715/729; 715/743; 715/859

(58) Field of Classification Search
USPC .................. 715/714, 710, 728, 729, 743, 859
See application file for complete search history.

(56) References Cited

U.S. PATENT DOCUMENTS

| | | | | | |
|---|---|---|---|---|---|
| 3,703,684 | A | * | 11/1972 | McVoy ........................... | 725/16 |
| 3,859,475 | A | * | 1/1975 | Wulfsberg et al. ............ | 455/431 |
| 4,624,012 | A | * | 11/1986 | Lin et al. ....................... | 704/261 |
| 4,890,108 | A | * | 12/1989 | Drori et al. .................... | 341/176 |
| 5,452,439 | A | * | 9/1995 | Makino ......................... | 715/710 |
| 5,659,366 | A | * | 8/1997 | Kerman ......................... | 725/34 |
| 5,822,123 | A | * | 10/1998 | Davis et al. ................... | 725/43 |
| 5,825,407 | A | * | 10/1998 | Cowe et al. ................... | 725/143 |
| 6,020,910 | A | * | 2/2000 | Schmidt et al. ................ | 725/28 |
| 6,081,290 | A | * | 6/2000 | Schmidt et al. ................ | 725/28 |
| 6,128,031 | A | * | 10/2000 | Schmidt et al. ................ | 725/28 |
| 6,281,809 | B1 | * | 8/2001 | Potter, Sr. ..................... | 340/933 |
| 7,248,836 | B2 | * | 7/2007 | Taylor ........................ | 455/67.11 |
| 7,293,275 | B1 | * | 11/2007 | Krieger et al. ................. | 725/40 |
| 7,546,143 | B2 | * | 6/2009 | Nelson et al. ............... | 455/556.2 |
| 7,573,847 | B2 | * | 8/2009 | Rogers et al. ................. | 370/329 |
| 7,574,718 | B2 | * | 8/2009 | Jeong ............................. | 725/28 |
| 7,882,434 | B2 | * | 2/2011 | Slotznick et al. ............. | 715/710 |
| 8,122,354 | B1 | * | 2/2012 | Torgerson ..................... | 715/710 |
| 2002/0029383 | A1 | * | 3/2002 | Moir .............................. | 725/40 |
| 2002/0091977 | A1 | * | 7/2002 | Mastro et al. ................. | 714/712 |
| 2002/0160816 | A1 | * | 10/2002 | Vitallo et al. ................. | 455/566 |
| 2003/0001881 | A1 | * | 1/2003 | Mannheimer et al. ........ | 345/728 |
| 2003/0018972 | A1 | * | 1/2003 | Arora ............................. | 725/47 |

(Continued)

FOREIGN PATENT DOCUMENTS

EP 358478 A2 * 3/1990 ............. E05B 49/00

OTHER PUBLICATIONS

Bing search q=spoken+indicator+content+rating&qs Feb. 4, 2014.*
Bing search q=spoken+indicator+program+rating&go Feb. 4, 2014.*

(Continued)

*Primary Examiner* — Boris Pesin
*Assistant Examiner* — John Heffington
(74) *Attorney, Agent, or Firm* — Toler Law Group, PC

(57) ABSTRACT

A method includes receiving user input indicating a selection of a first multimedia channel from a set of multimedia channels for display. The method further includes determining a first user-selected audio indicator associated with the first multimedia channel. The method additionally includes providing the first audio indicator for audible output in response to receiving the user input indicating the selection of the first multimedia channel. Another method includes providing a user interface to facilitate an association of one or more audio indicators with one or more corresponding channel selection actions.

30 Claims, 5 Drawing Sheets

(56) References Cited

U.S. PATENT DOCUMENTS

| | | | |
|---|---|---|---|
| 2003/0023969 A1* | 1/2003 | Jeong | 725/28 |
| 2003/0023989 A1* | 1/2003 | Chevallier et al. | 725/153 |
| 2003/0066075 A1 | 4/2003 | Bahn et al. | |
| 2004/0003399 A1 | 1/2004 | Cooper | |
| 2004/0067471 A1* | 4/2004 | Bennett | 434/167 |
| 2004/0130580 A1* | 7/2004 | Howard et al. | 345/854 |
| 2004/0130581 A1* | 7/2004 | Howard et al. | 345/854 |
| 2004/0264301 A1* | 12/2004 | Howard et al. | 368/28 |
| 2004/0266491 A1* | 12/2004 | Howard et al. | 455/567 |
| 2005/0009528 A1* | 1/2005 | Iwamura et al. | 455/446 |
| 2005/0041667 A1* | 2/2005 | Miller et al. | 370/395.4 |
| 2005/0210343 A1* | 9/2005 | Mastro et al. | 714/712 |
| 2005/0266793 A1* | 12/2005 | Grossman et al. | 455/3.01 |
| 2005/0278750 A1* | 12/2005 | Grossman et al. | 725/62 |
| 2006/0026088 A1* | 2/2006 | Grossman et al. | 705/37 |
| 2006/0035628 A1* | 2/2006 | Miller et al. | 455/414.3 |
| 2006/0046732 A1* | 3/2006 | Grossman et al. | 455/450 |
| 2006/0062172 A1* | 3/2006 | Grossman et al. | 370/328 |
| 2006/0063516 A1* | 3/2006 | Grossman et al. | 455/414.3 |
| 2006/0063567 A1* | 3/2006 | Grossman et al. | 455/566 |
| 2006/0294573 A1* | 12/2006 | Rogers et al. | 725/147 |
| 2007/0011558 A1* | 1/2007 | Wright et al. | 714/755 |
| 2007/0047533 A1* | 3/2007 | Criddle et al. | 370/356 |
| 2007/0073834 A1* | 3/2007 | Charlebois et al. | 709/217 |
| 2007/0107014 A1* | 5/2007 | Howard et al. | 725/44 |
| 2008/0104106 A1* | 5/2008 | Rosenberg et al. | 707/102 |
| 2008/0140239 A1* | 6/2008 | Rosenberg et al. | 700/94 |
| 2008/0263607 A1* | 10/2008 | Gurevich et al. | 725/92 |
| 2009/0006959 A1* | 1/2009 | Kalenius et al. | 715/710 |
| 2009/0044226 A1* | 2/2009 | Ellis et al. | 725/46 |
| 2009/0227244 A1* | 9/2009 | Small et al. | 455/418 |
| 2010/0048183 A1* | 2/2010 | Goodman et al. | 455/414.1 |
| 2010/0057588 A1* | 3/2010 | Yukie et al. | 705/26 |
| 2010/0192179 A1* | 7/2010 | Ellis et al. | 725/40 |
| 2010/0197284 A1* | 8/2010 | Small et al. | 455/414.1 |
| 2010/0251303 A1* | 9/2010 | Ellis et al. | 725/43 |
| 2012/0066102 A1* | 3/2012 | Yukie et al. | 705/34 |

OTHER PUBLICATIONS

Bing search q=voice+indicator+content+rating&qs= Feb. 4, 2014.*
Bing search q=voice+indicator+program+rating&qs= Feb. 4, 2014.*

* cited by examiner

SYSTEM AND METHOD FOR PROVIDING USER-DEFINABLE AUDIO INDICATORS FOR MULTIMEDIA CHANNEL SELECTIONS

FIELD OF THE DISCLOSURE

The present disclosure is generally related to the selection and display of multimedia content and the use of audible indicators related thereto.

BACKGROUND

Some multimedia components, such as televisions and set top boxes, output a preset tone when a user switches between channels for viewing. This preset tone is the same regardless of the channel selected and therefore fails to provide a description or context for characteristics of the channel selected. In contrast, visual indicators, such as station logos or displayed channel numbers, allow a viewer to identify a channel number or broadcast station associated with the channel selected for viewing. However, these visual indicators fail to provide the context of the selected channel to those who are not within direct visual range of the display or who otherwise might not notice the displayed visual indicator. For example, a caregiver may wish to monitor the television channels viewed by a child, but it may be inconvenient for the caregiver to continually stay within direct visual range of the television so as to verify that the child has not selected an inappropriate television channel. Accordingly, an improved technique for indicating a selection of a multimedia channel would be advantageous.

DETAILED DESCRIPTION OF THE DRAWINGS

Figure 1:
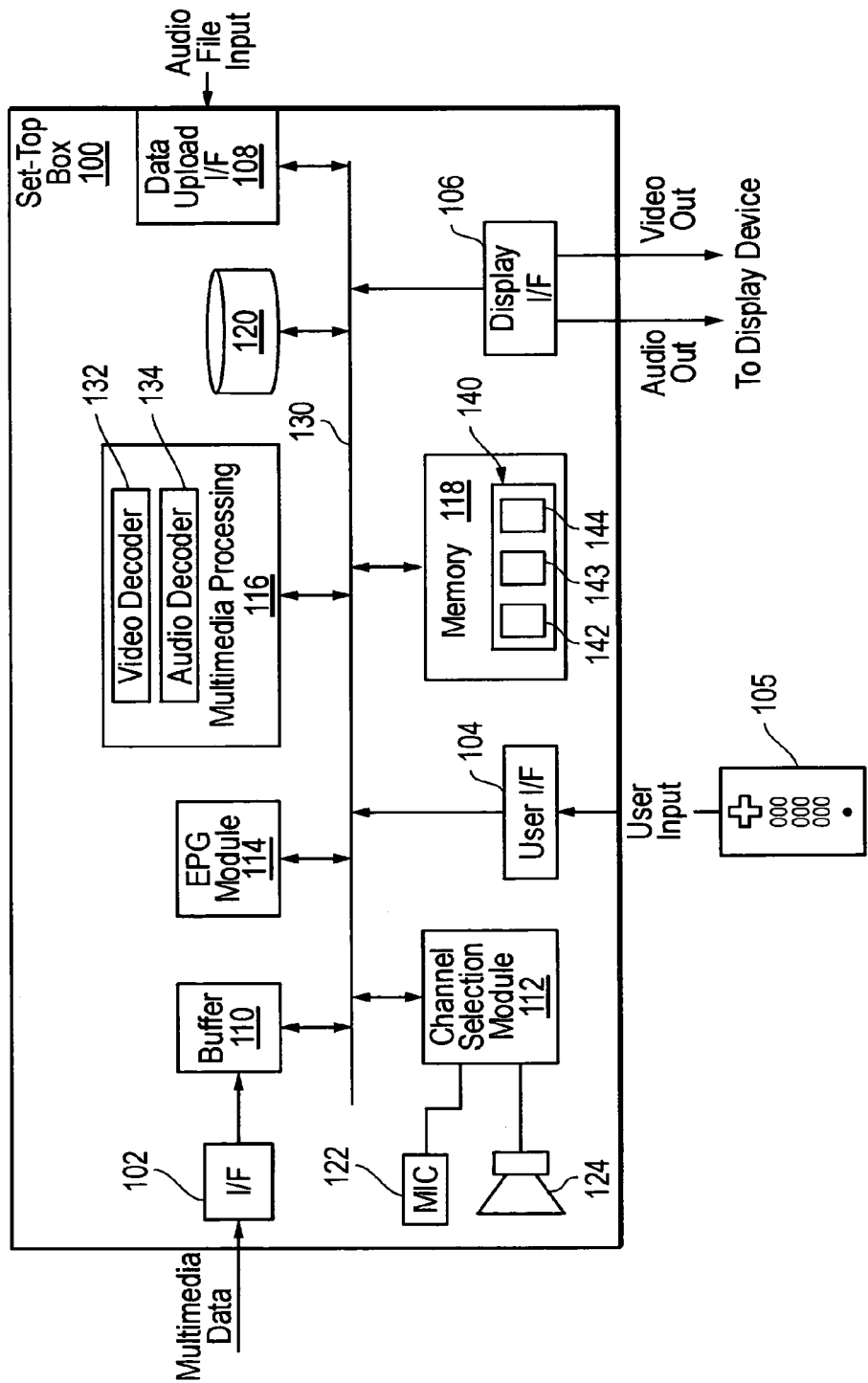
FIG. 1 is a block diagram illustrating an exemplary set-top box utilizing user-selected audio indicators in accordance with at least one embodiment of the present disclosure.

In accordance with a particular aspect of the present disclosure, a method is disclosed that includes receiving user input indicating a selection of a first multimedia channel from a set of multimedia channels for display. The method further includes determining a first user-selected audio indicator associated with the first multimedia channel. The method additionally includes providing the first audio indicator for audible output in response to receiving the user input indicating the selection of the first multimedia channel.

In accordance with another aspect of the present disclosure, another method is disclosed that includes providing a user interface to facilitate an association of one or more audio indicators with one or more corresponding channel selection actions. The method further includes receiving a first user input indicating an association of a selected audio indicator with a selected channel selection action via the user interface. The method also includes providing the selected audio indicator for audible output in response to receiving a second user input indicating the selected channel selection action.

In accordance with yet another aspect of the present disclosure, a system is disclosed. The system includes a user interface to receive user input indicating a selected multimedia channel from a set of multimedia channels. The system further includes a channel selection module operably connected to the first interface. The channel selection module is to determine a user-selected audio indicator associated with the selected multimedia channel and provide the user-selected audio indicator for audible output in response to the user input.

In accordance with an additional aspect of the present disclosure, a computer readable medium embodying a plurality of instructions is disclosed. The plurality of instructions includes instructions to manipulate a processor to receive user input indicating a selection of a first multimedia channel from a set of multimedia channels for display. The plurality of instructions further includes instructions to manipulate a processor to determine a first user-selected audio indicator associated with the first multimedia channel and provide the first user-selected audio indicator for audible output in response to receiving the user input indicating the selection of the first multimedia channel.

In accordance with another aspect of the present disclosure, the plurality of instructions include instructions to provide a user interface to facilitate an association of one or more audio indicators with one or more corresponding channel selection actions. The plurality of instructions further includes instructions to manipulate a processor to receive a first user input indicating an association of selected first audio indicator with a selected channel selection action via the user interface and provide the selected audio indicator for audible output in response to receiving a second user input indicating the selected channel selection action.

For ease of illustration, the exemplary techniques disclosed herein are described in the context of a set-top box, such as a cable television set-top box, a satellite television set-top box, or a personal video recorder (PVR). Using the guidelines provided herein, those skilled in the art can utilize the disclosed techniques in other multimedia processing devices without departing from the scope of the present disclosure. Examples of multimedia processing devices in which the disclosed techniques may be advantageously employed include televisions, portable video players, personal digital assistants (PDAs), desktop computers, notebook computers, video-enabled cell phones, and the like.

Referring to FIG. 1, an exemplary set-top box 100 is illustrated in accordance with at least one embodiment of the present disclosure. As shown, the set-top box 100 includes a data interface 102, a user interface 104, a display interface 106, and a data upload interface 108. The set-top box 100 further includes a buffer 110, a channel selection module 112, an electronic programming guide (EPG) module 114, a multimedia processing module 116, memory 118 (e.g., random access memory (RAM) or read only memory (ROM)), a storage device 120 (e.g., a hard disk drive or flash memory), a microphone 122, and a speaker 124. In the illustrated example, the components of the set-top box 100 are connected via one or more busses 130. Various components of the set-top box 100 can be implemented as hardware, software, firmware, or combinations thereof. To illustrate, one or more of the illustrated components of the set-top box 100 may be implemented in part or in whole as executable instructions stored in the memory 118 and executed by the multimedia processing module 116 or another processor (e.g., a central processing unit (CPU)) to perform the techniques described herein.

The data interface 102 can include any of a variety of interfaces to receive multimedia data representative of one or more of a set of multimedia channels, such as a coaxial cable interface to receive cable television transmissions, a wireless interface to receive satellite or broadcast transmissions, a data packet network interface, such as an Ethernet interface, or a combination thereof. The user interface 104 can include any of a variety of interfaces to receive user input, such as a remote control interface (e.g., an infrared interface or a radiofrequency interface) to receive remote control commands from a remote control 105, or a button panel manipulated by a user. The data upload interface 108 can include any of a variety of data interfaces, such as a universal serial bus (USB), a FireWire interface, a data network interface (e.g., an Ethernet interface), and the like. The display interface 106 can include any of a variety of video interfaces, such as an S-video interface, a composite video interface, or a video graphics array (VGA) interface, as well as any of a variety of audio interfaces, such as a high definition multimedia interface (HDMI) or a Radio Corporation of America (RCA) interface.

During a configuration mode, the EPG module 114 provides an EPG or other graphical user interface (GUI) for display at a display device (not shown) via the display interface 106. The EPG module 114 can provide an interface for displaying channel programming information, such as a listing of some or all of the channels available for viewing, as well as descriptive information associated with each listed channel. Further, in a particular embodiment, the EPG module 114 provides a user interface to facilitate the input of audio indicator configuration information from a user. The audio indicator configuration information represents associations of one or more selected audio indicators with certain channel selection actions, where the channel selection actions can include the selection of the previous channel or the next channel in the listing or sequence of channels, the selection of a particular channel and the like. The input of audio configuration information from a user allows the user to customize audio indicators that are audibly output during certain channel selection actions. The user can provide user input via the user interface 104 so as to associate a particular audio indicator with the selection of a specific channel, with the selection of a particular category or class of channels or those channels having certain characteristics, or with the selection of all channels.

The user-selected audio indicator can be selected from a database 140 or other collection of audio indicators 142, 143, 144 stored in a storage component of the set-top box 100 (e.g., the memory 118 or the storage device 120). Alternately, the user can direct the upload of one or more audio content files that are representative of audio indicators for addition to the database 140 via the data upload interface 108. Further, in one embodiment, the user can record voice-based audio indicators using the microphone 122 for addition to the database 140. An exemplary GUI for receiving audio indicator configuration information from a user is discussed in greater detail herein with reference to FIG. 2.

In a channel browsing mode, the user provides input indicating a particular channel selection action, such as the selection of the previous channel or the next channel in the channel sequence or the selection of a particular channel, via the user interface 104. In response, the channel selection module 112 directs the multimedia processing module 116 to obtain the multimedia data associated with the selected channel from the buffer 110 and to process the video content and/or audio content of the obtained multimedia data for display at the display device.

Further, the channel selection module 112 determines the user-selected audio indicator associated with the indicated channel selection action based on the audio indicator configuration information obtained during the configuration mode. The channel selection module 112 provides the identified audio indicator for audible output so that an audible descriptor is provided to the user. In one embodiment, the channel selection module 112 provides the selected audio indicator for audible output by converting the data representative of the selected audio indicator to an analog signal that is used to drive the speaker 124 of the set-top box 100. In another embodiment, the channel selection module 112 provides the data representative of the selected audio indicator to the multimedia processing module 116 for incorporation into its audio output to the display device so that the audio indicator is output by a speaker system of the display device.

In one embodiment, the audio indicator configuration information may be represented as a table or other data structure having an entry for each pairing between a particular channel selection action and its corresponding user-selected audio indicator. In this instance, the channel selection module 112 can determine the user-selected audio indicator associated with the indicated channel selection action by performing a table lookup using the particular channel selection action as the index. Alternately, the audio indicator configuration information may be represented as a table or other data structure having an entry for each pairing between one or more particular channel characteristics and a corresponding audio indicator. Exemplary channel characteristics include a content category (e.g., "sports," "comedy," "drama," "news," etc.), a content level (e.g., "G," "PG," "PG-13," "R," or "NR" for film ratings or "Y," "Y7," "PG," "14," or "MA" for television ratings), a play length, and the like. In this instance, the channel selection module 112 can determine the user-selected audio indicator associated with the indicated channel selection by determining the characteristics of the selected multimedia channel and performing a table lookup based on the determined characteristics. In one embodiment, the characteristics of the selected multimedia channel can be determined from EPG information provided by the EPG module 114.

The user can select a particular audio indicator to provide context to a channel selection. For example, the audio indicator associated with the selection of a channel can provide an audible description of a content category associated with the selected channel (e.g., by audibly outputting the word "sports" when a channel carrying sports content is selected or by audibly outputting the title of the show or movie carried by the selected multimedia channel). Alternately, the audio indicator can provide an audible description of the content level (e.g., by audibly outputting the phrase "parental guidance suggested" when a channel carrying PG-rated content is selected) or different voices may be associated with different content levels (e.g., a recording of a child's voice for G and PG rated content, a teenager's voice for PG-13 rated content, and an adult's voice for R rated content). Further, the user can record or otherwise provide an audio indicator that relays instructions or a warning for a particular channel selection action (e.g., by audibly outputting the phrase "parental control enabled—enter password") when a user selects a channel having restricted content. Other exemplary audio indicators can include short audio clips from songs or movies, whimsical sounds, or an audible output of the channel number or other channel identifier (such as the broadcast station) associated with a selected channel. Moreover, a user-selected audio indicator can include a sequence or other combination of audio indicators (e.g., an audible output of the phrase "channel 103—rated R").

Figure 2:
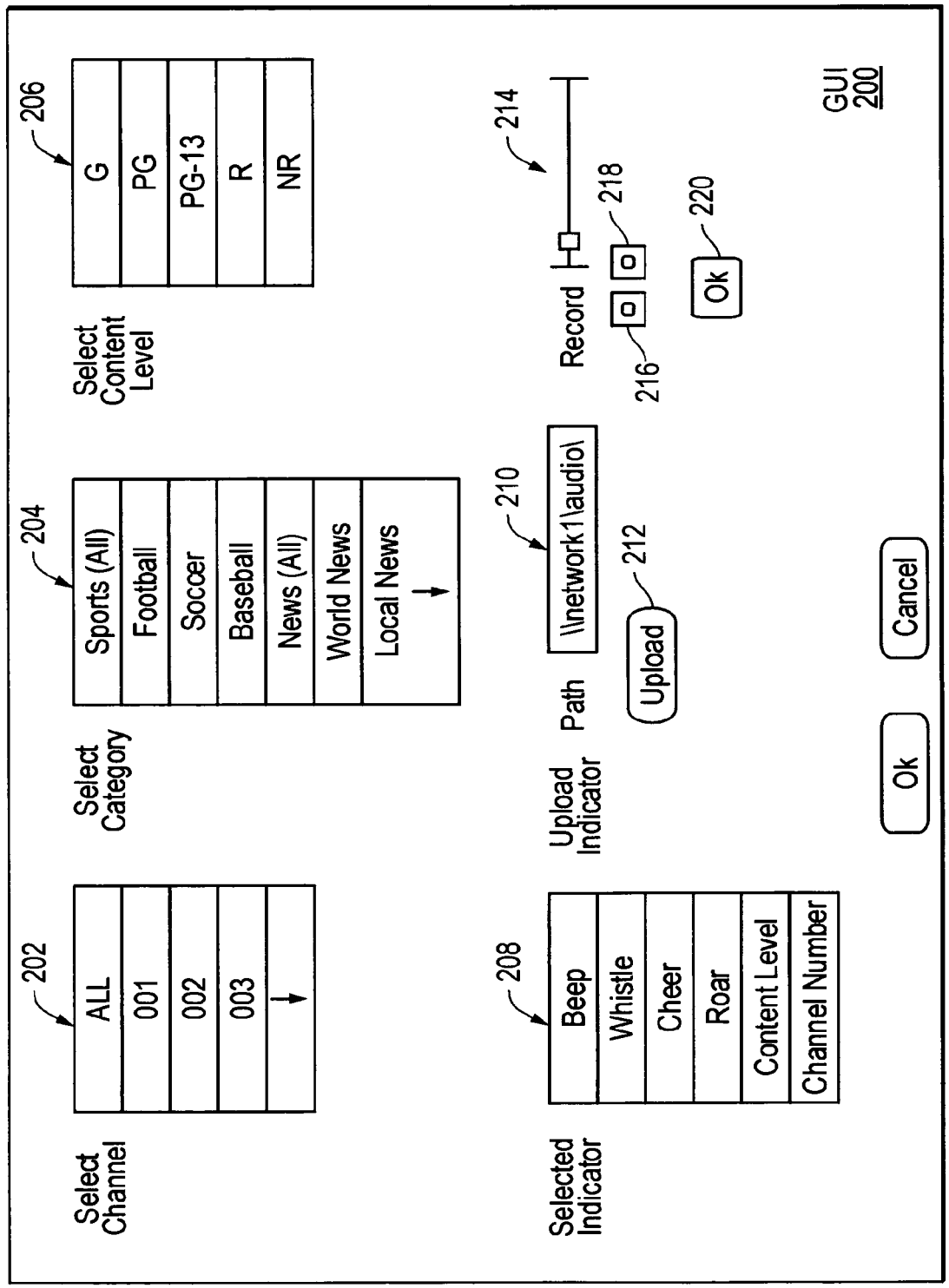
FIG. 2 is a block diagram illustrating an exemplary graphical user interface for receiving audio indicator configuration information from a user in accordance with at least one embodiment of the present disclosure.

Referring to FIG. 2, a GUI 200 used by the set-top box 100 of FIG. 1 to facilitate the input of audio indicator configuration information from a user is illustrated. In the illustrated example, the GUI 200 includes a plurality of user-selectable channel characteristic lists, such as a channel number list 202 to list the channel numbers of the channels available for viewing, a content category list 204 to list the available content categories and sub-categories, and a content level list 206 to list the available content levels. In one embodiment, the user can utilize the GUI 200 to add, delete, or edit entries in the channel characteristic lists. The GUI 200 further includes an indicator select list 208 to list audio indicators available from the database 140 and/or other accessible locations. The indicator select list 208 may list all available audio indicators, or the list may be filtered based on selected characteristics from one or more of the channel characteristic lists.

The GUI 200 also includes an audio content file upload feature 210 so as to locate and upload an audio content file for inclusion as an audio indicator in the database 140 based on a supplied directory path and in response to selection of an upload button 212. The GUI 200 additionally can include an audio indicator recorder feature 214 having a record button 216, stop button 218, and an accept button 220 that can be manipulated by a user so as to record a custom audio indicator via the microphone 122 (FIG. 1).

A user can utilize one or more of the channel characteristic lists so as to identify a particular channel selection action to which a particular audio indicator is to be associated. To illustrate, the user could select the "ALL" channels entry from the channel number list 202 and select the "Channel Number" entry or the "Content Level" entry of the indicator list 208 so as to direct the set-top box 100 to audibly output the channel number or the content level, respectively, of a channel when it is selected for display. As another example, the user could select the "All" channels entry from the channel number list 202 and the "Roar" entry from the indicator so that the "Roar" audio indicator is audibly output whenever any channel is selected. Further, the user could individually select one of the listed audio indicators for each channel in the channel number list 202.

Rather than assigning an audio indicator by individual channel, the user can assign an audio indicator for output whenever a channel is selected that has a particular characteristic. To illustrate, the user could select the "Football" subcategory entry from the content category list 204 and the "whistle" entry from the indicator list 208 so as to direct the set-top box 100 to audibly output a whistle sound whenever a channel having football content is selected for display. Likewise, the user could select the "R" entry of the content level list 206 and the "Beep" entry of the indicator list 208 so as to direct the set-top box 100 to audibly output a beep sound whenever a channel having a restricted content level is selected for display. Moreover, it will be appreciated that a user may associate particular audio indicators with various combinations of channel characteristics.

Figure 3:
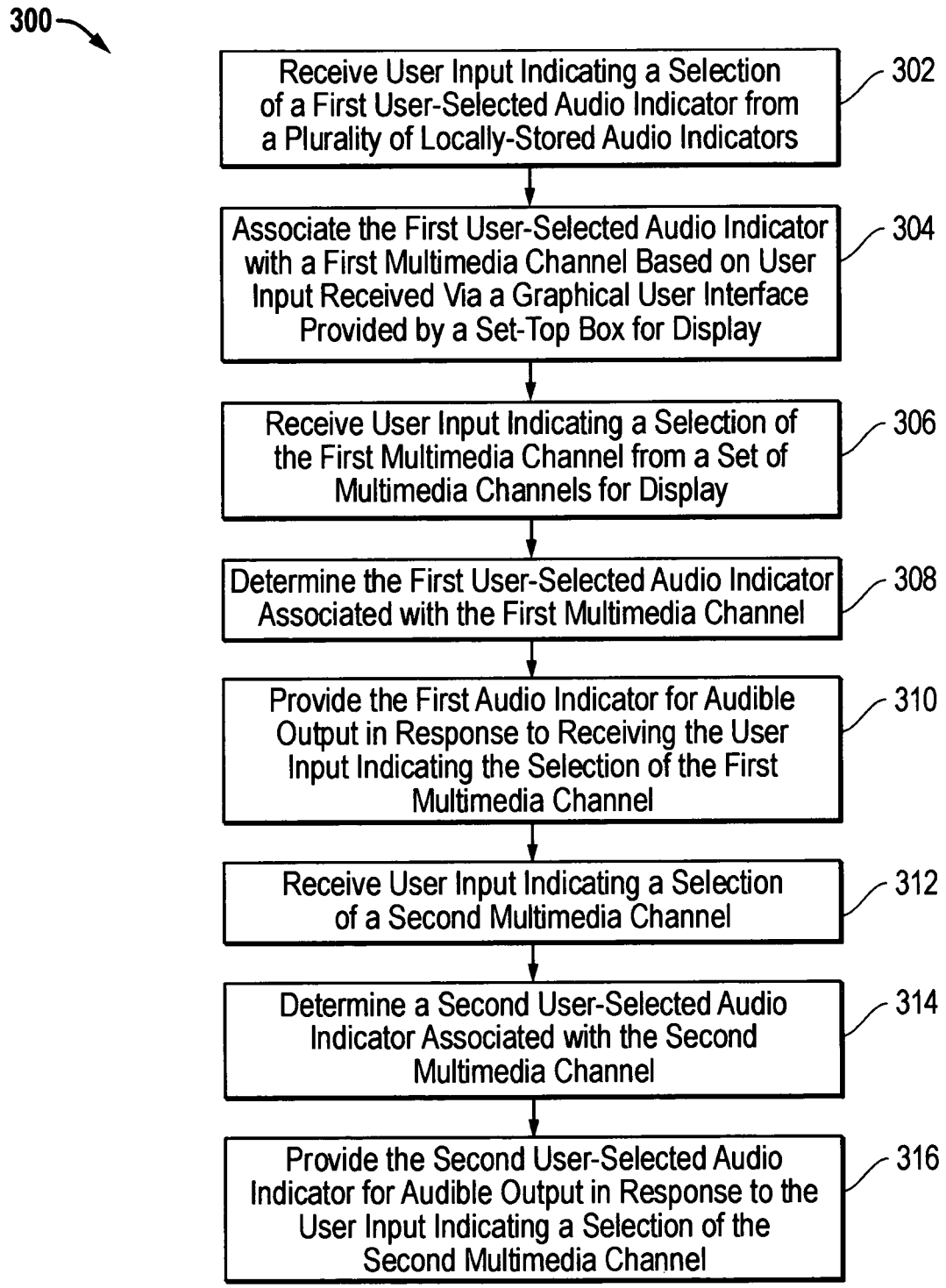
FIGS. 3 and 4 are flow diagrams illustrating exemplary methods for providing audio indicators for audible output in response to channel selection actions in accordance with at least one embodiment of the present disclosure.

Referring to FIG. 3, an exemplary method 300 for providing customized audio indicators during channel browsing is illustrated. The method 300 includes receiving user input indicating a selection of a first user-selected audio indicator from a plurality of locally-stored audio indicators at block 302. Alternately, the user input can include an uploaded audio content file selection.

The method 300 further includes associating the first user-selected audio indicator with a first multimedia channel of a set of multimedia channels at block 304. The set of multimedia channels can include, for example, multimedia channels received via a terrestrial television broadcast, a satellite television broadcast, a cable television transmission, a data network streaming video transmission, or combinations thereof. The first user-selected audio indicator can be directly associated with the first multimedia channel or it can be associated with a subset of multimedia channels, including the first multimedia channel, based on one or more characteristics common to the subset of multimedia channels. The user input indicating the selection of the first user-selected audio indicator or the uploaded audio content file selection and the association of the first user-selected audio indicator with the first multimedia channel can be facilitated using an EPG or other user interface displayed for a user, where the user can provide input via remote control commands or input from a button panel or other interface.

At block 306, the method 300 includes receiving user input indicating a selection of the first multimedia channel from a set of multimedia channels for display. The user input indicating a selection of the first multimedia channel can include user input that represents a selection of the previous multimedia channel or the next multimedia channel in a sequence of multimedia channels available for display (e.g., where a user selects a "previous channel" button, a "channel down" button, a "next channel" button or a "channel up" button on a remote control). Alternately, the user input can represent an express selection of the first multimedia channel (e.g., where a user selects a sequence of number buttons of a remote control, thereby identifying the channel number of the first multimedia channel).

At block 308, the method 300 includes determining the first user-selected audio indicator in response to the user input indicating the selection of the first multimedia channel. The first user-selected audio indicator can be determined by selecting the first user-selected audio indicator from a plurality of locally-stored audio indicators based on one or more characteristics of the first multimedia channel that are matched to or otherwise linked with the first user-selected audio indicator. These characteristics can include a multimedia content category associated with the first multimedia channel (e.g., a "news" category or a "sports" category), a content level associated with the first multimedia channel (e.g., a "G" rating or a "PG" rating), a play length, a content source (e.g., a cable television broadcast or a satellite television broadcast), and the like. By way of illustration, a user can associate an audio indicator that provides an audible output of the word "news" with those multimedia channels that include news content. Thus, if the first multimedia channel includes news content, the audio indicator that provides the audible output of the word "news" can be determined as the first audio indicator.

In one embodiment, the first audio indicator is descriptive of one or more characteristics of the first multimedia channel. To illustrate, the first audio indicator can represent an audible description of the content level or content category of the first multimedia channel, an audible description of a channel number or other identifier associated with the first multimedia channel, an audible representation of a play length of the first multimedia channel, a voice recording of a user describing some aspect of the first multimedia channel, and the like.

The method 300 further includes providing the first user-selected audio indicator for audible output in response to receiving the user input indicating the selection of the first multimedia channel at block 310. The first user-selected audio indicator can be provided for audible output via the speaker system of a display device, a speaker system of a set-top box, or other multimedia processing system.

At block 312, the method 300 includes receiving user input indicating a selection of a second multimedia channel for display. At block 314, the method 300 includes determining a second user-selected audio indicator associated with the second multimedia channel, and at block 316, the method 300 includes providing the second user-selected audio indicator for output in response to the user input indicating the selection of the second multimedia channel. In one embodiment, the user may have provided audio indicator configuration information that indicates that the same audio indicator is to be provided for audible output when either the first multimedia channel or the second multimedia channel is selected. In this instance, the first and second audio indicators are the same. Alternately, the first and second multimedia channels may have different characteristics or the user may have explicitly directed that different audio indicators be provided for audible output. Accordingly, the first and second audio indicators may be different audio indicators.

Figure 4:
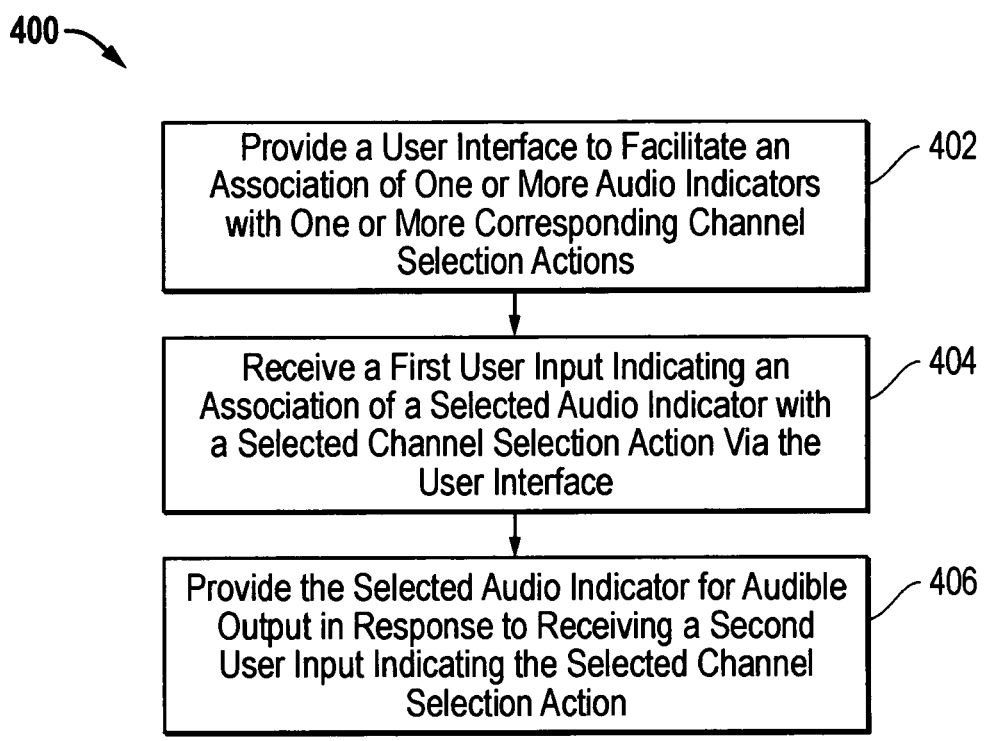

Referring to FIG. 4, a method 400 for receiving audio indicator configuration information and providing audio indicators upon channel selections is illustrated. The method 400 includes providing a user interface to facilitate an association of an audio indicator with a corresponding channel selection action, at block 402. The user interface, in an illustrative embodiment, includes an EPG or other GUI to facilitate the input of audio indicator configuration information, such as the GUI 200 described with reference to FIG. 2. The channel selection action can include the selection of the previous channel or the next channel in a sequence of channels available for display, or the channel selection action can include the selection of a particular multimedia channel.

The method 400 further includes receiving a first user input indicating an association of the audio indicator with the channel selection action via the user interface, at block 404. In one embodiment, the first user input includes a user selection of an audio indicator from a plurality of predefined audio indicators. Alternately, the first user input can include an audio content file selection representative of an audio indicator. The audio indicator can be associated with the channel selection action based on one or more characteristics of a channel selected by the channel selection action.

At block 406, the method 400 includes providing the audio indicator for audible output in response to receiving a second user input indicating the channel selection action. The audio indicator can be provided for audible output via a speaker system of a display device or via a speaker system of a set-top box or other multimedia processing device.

As an exemplary illustration, the method 400 may be implemented at an Internet Protocol Television (IPTV) set-top box whereby multimedia data is received via an IP network and processed for display at a television display, such as a high-definition television (HDTV). In this example, the user interface provided at block 402 includes the GUI 200 of FIG. 2, and the first user input received at block 402 may include input provided during configuration of the IPTV set-top box via, for example, a remote control operable to control certain functionality of the IPTV set-top box. The remote control commands can be interpreted by the IPTV set-top box in the context of the displayed GUI 200 so as to associate identified audio indicators with certain channel selections. Accordingly, while using the IPTV set-top box for viewing a channel, the user selects a particular channel via the remote control and the IPTV set-top box prepares the multimedia data of the selected channel for display. In addition, the IPTV set-top box identifies the user-selected audio indicator associated with the selected channel in response to the remote control commands that indicate the selected channel and provides the identified audio indicator as audible output before, during, or after switching the display to the selected channel.

Figure 5:
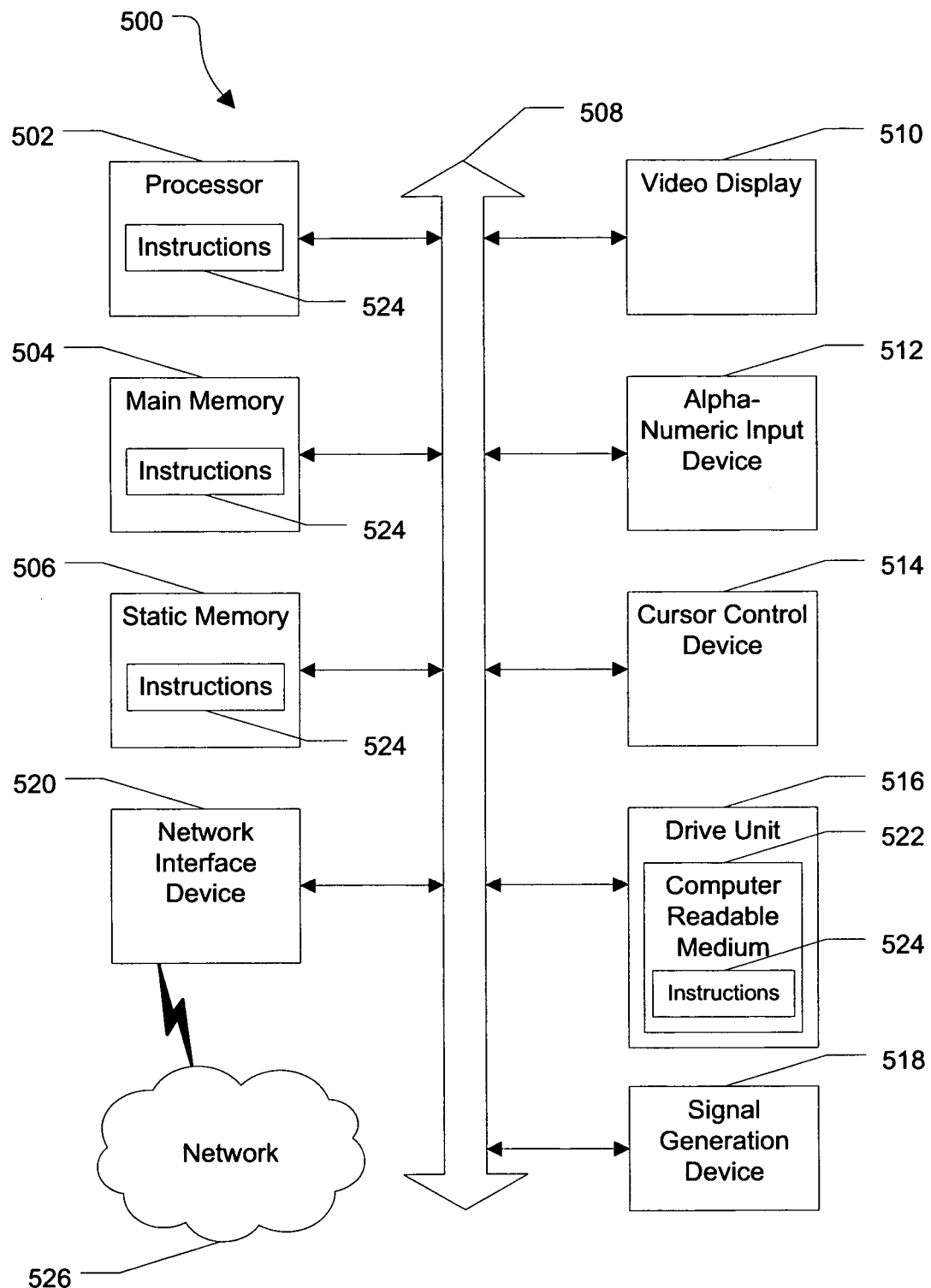
FIG. 5 is a block diagram illustrating an exemplary general computer system for implementing one or more of the techniques illustrated in FIGS. 1-4 in accordance with at least one embodiment of the present disclosure.

Referring to FIG. 5, an illustrative embodiment of a computer system is shown and is designated 500. The computer system 500 can include a set of instructions that can be executed to cause the computer system 500 to perform any one or more of the methods or computer-based functions disclosed herein. The computer system 500 may operate as a standalone device or may be connected, e.g., using a network, to other computer systems or peripheral devices.

The computer system 500 can be implemented as or incorporated into various devices, such as a set-top box, an Internet Protocol television (IPTV) device, a personal computer (PC), a tablet PC, a personal digital assistant (PDA), a mobile device, a palmtop computer, a laptop computer, a desktop computer, a communications device, a wireless telephone, a land-line telephone, a control system, a camera, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a general processing unit (GPU), or both. Moreover, the computer system 500 can include a main memory 504 and a static memory 506 that communicate via a bus 508. As shown, the computer system 500 may further include or be connected to a video display unit 510, such as a liquid crystal display (LCD), an organic light emitting diode (OLED), a flat panel display, a solid state display, or a cathode ray tube (CRT). To illustrate, the computer system 500 may include a set-top box connected to a separate television display, whereby the set-top box receives and processed multimedia data in accordance with the disclosed techniques and provides the processed multimedia for display at the television device. Additionally, the computer system 500 may include an input device 512, such as a button pad, and a user input device 514, such as a remote control input or a video game control. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the techniques as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving user input indicating a selection of a first multimedia channel from a set of multimedia channels for display;
determining a first audio indicator, wherein the first audio indicator represents a voice associated with a content rating level of the first multimedia channel, wherein different voices are associated with different content rating levels, and wherein the voice represents a voice of a child when the content rating level is associated with child type content; and
providing the first audio indicator for audible output in response to receiving the user input indicating the selection of the first multimedia channel.

2. The method of claim 1, wherein the first audio indicator is provided as audible output before switching to the first multimedia channel.

3. The method of claim 1, wherein the first audio indicator is provided as audible output after switching to the first multimedia channel.

4. A method comprising:
receiving user input indicating a selection of a first multimedia channel from a set of multimedia channels for display;
determining a first audio indicator, wherein the first audio indicator represents a voice associated with a content rating level of the first multimedia channel, wherein different voices are associated with different content rating levels, and wherein the voice represents a voice of a teenager when the content rating level is associated with teenage type content; and
providing the first audio indicator for audible output in response to receiving the user input indicating the selection of the first multimedia channel.

5. The method of claim 4, wherein the first audio indicator is provided as audible output before switching to the first multimedia channel.

6. The method of claim 4, wherein the first audio indicator is provided as audible output after switching to the first multimedia channel.

7. A method comprising:
receiving user input indicating a selection of a first multimedia channel from a set of multimedia channels for display;
determining a first audio indicator, wherein the first audio indicator represents a voice associated with a content rating level of the first multimedia channel, wherein different voices are associated with different content rating levels, and wherein the voice represents a voice of an adult when the content rating level is associated with adult type content; and
providing the first audio indicator for audible output in response to receiving the user input indicating the selection of the first multimedia channel.

8. The method of claim 7, wherein the first audio indicator is provided as audible output before switching to the first multimedia channel.

9. The method of claim 8, wherein the first audio indicator includes an instruction to enter a password to access the first multimedia channel.

10. The method of claim 7, wherein the first audio indicator is provided as audible output after switching to the first multimedia channel.

11. A method comprising:
receiving user input indicating a selection of a first multimedia channel from a set of multimedia channels for display;
determining a first audio indicator, wherein the first audio indicator represents a voice associated with a content rating level of the first multimedia channel, and wherein different voices are associated with different content rating levels; and
providing the first audio indicator for audible output in response to receiving the user input indicating the selection of the first multimedia channel.

12. The method of claim 11, wherein the first audio indicator represents an audible description of the content rating level.

13. The method of claim 12, wherein the audible description of the content rating level represents a "G," "PG," "PG-13," "R," or "NR" content level for film.

14. The method of claim 12, wherein the audible description of the content rating level represents a "Y," "Y7," "PG," "14," or "MA" content level for television.

15. The method of claim 11, further comprising:
receiving user input indicating a selection of a second multimedia channel;
determining a second audio indicator associated with a content rating level of the second multimedia channel; and
providing the second audio indicator for audible output in response to the user input indicating the selection of the second multimedia channel, wherein the second audio indicator represents the voice associated with the content rating level of the first multimedia channel when the content rating level of the second multimedia channel is the same as the content rating level of the first multimedia channel.

16. The method of claim 15, wherein the first audio indicator represents a second voice different than the voice when the content rating level of the second multimedia channel is different than the content rating level of the first multimedia channel.

17. The method of claim 11, wherein the user input indicating the selection of the first multimedia channel comprises one of user input representative of a selection of a next multimedia channel in a sequence of multimedia channels, a selection of a previous multimedia channel in the sequence of multimedia channels, and a selection of a specific channel.

18. The method of claim 17, wherein the selection of a next multimedia channel in a sequence of multimedia channels includes a selection of a "channel up button."

19. The method of claim 17, wherein the selection of a previous multimedia channel in a sequence of multimedia channels includes a selection of a "channel down button."

20. The method of claim 11, wherein the first audio indicator is determined in response to the user input indicating the selection of the first multimedia channel.

21. The method of claim 11, wherein the first audio indicator is determined prior to receiving the user input indicating the selection of the first multimedia channel.

22. The method of claim 11, wherein the first audio indicator represents a warning based on the content rating level.

23. The method of claim 22, wherein the warning identifies a restricted content rating level.

24. The method of claim 22, wherein the warning identifies a parental guidance suggested content rating level.

25. The method of claim 11, wherein the first audio indicator relays instructions based on the content rating level.

26. The method of claim 25, wherein the instructions include directions to enter a password when parental control is enabled.

27. The method of claim 11, wherein the first audio indicator includes a combination of audio indicators.

28. The method of claim 11, wherein the first audio indicator is provided as audible output before switching to the first multimedia channel.

29. The method of claim 11, wherein the first audio indicator is provided as audible output during switching to the first multimedia channel.

30. The method of claim 11, wherein the first audio indicator is provided as audible output after switching to the first multimedia channel.

* * * * *